United States Patent [19]
Hartmaier et al.

[11] Patent Number: 5,978,672
[45] Date of Patent: Nov. 2, 1999

[54] MOBILITY EXTENDED TELEPHONE APPLICATION PROGRAMMING INTERFACE AND METHOD OF USE

[75] Inventors: Peter J. Hartmaier, Newmarket, Canada; William E. Gossman, Oakton, Va.

[73] Assignee: Global Mobility Systems, Inc., Bellevue, Wash.

[21] Appl. No.: 08/720,089

[22] Filed: Sep. 27, 1996

[51] Int. Cl.⁶ .................................................. H04Q 7/22
[52] U.S. Cl. ...................... 455/413; 455/414; 455/417; 455/433; 455/461
[58] Field of Search .................... 455/412–417, 455/433, 445, 461

[56] References Cited

U.S. PATENT DOCUMENTS

| | | | |
|---|---|---|---|
| 5,159,592 | 10/1992 | Perkins | 370/85.7 |
| 5,377,186 | 12/1994 | Wegner et al. | 370/62 |
| 5,379,383 | 1/1995 | Yunoki | 395/325 |
| 5,418,844 | 5/1995 | Morrisey et al. | 379/207 |
| 5,425,090 | 6/1995 | Orriss | 379/201 |
| 5,428,665 | 6/1995 | Lantto | 379/58 |
| 5,440,613 | 8/1995 | Fuentes | 379/60 |
| 5,454,032 | 9/1995 | Pinard et al. | 379/167 |
| 5,469,496 | 11/1995 | Emery et al. | 379/58 |
| 5,474,748 | 12/1995 | Szabo | 422/186.04 |
| 5,481,590 | 1/1996 | Grimes | 379/57 |
| 5,490,139 | 2/1996 | Baker et al. | 370/60 |
| 5,490,203 | 2/1996 | Jain et al. | 379/59 |
| 5,493,692 | 2/1996 | Theimer et al. | 455/26.1 |
| 5,497,412 | 3/1996 | Lannen et al. | 379/60 |
| 5,502,757 | 3/1996 | Bales et al. | 379/58 |
| 5,506,837 | 4/1996 | Söllner et al. | 370/31 |
| 5,506,887 | 4/1996 | Emery et al. | 379/58 |
| 5,509,062 | 4/1996 | Carlsen | 379/210 |
| 5,513,243 | 4/1996 | Kage | 379/58 |
| 5,519,706 | 5/1996 | Bantz et al. | 370/85.3 |
| 5,521,963 | 5/1996 | Shrader et al. | 379/60 |
| 5,526,403 | 6/1996 | Tam | 379/59 |
| 5,530,736 | 6/1996 | Comer et al. | 379/58 |
| 5,530,963 | 6/1996 | Moore et al. | 395/200.15 |
| 5,533,026 | 7/1996 | Ahmadi et al. | 370/94.1 |
| 5,533,114 | 7/1996 | Ballard et al. | 379/220 |
| 5,537,610 | 7/1996 | Mauger et al. | 379/58 |
| 5,542,094 | 7/1996 | Owada et al. | 455/54.1 |
| 5,544,226 | 8/1996 | Weis et al. | 379/61 |
| 5,544,227 | 8/1996 | Blust et al. | 379/63 |
| 5,602,991 | 2/1997 | Berteau | 395/200.01 |

FOREIGN PATENT DOCUMENTS

| | | | |
|---|---|---|---|
| 9318606 | 9/1993 | WIPO | H04M 11/00 |
| 9526114 | 9/1995 | WIPO | H04Q 7/24 |
| 9613949 | 5/1996 | WIPO | H04Q 7/24 |

OTHER PUBLICATIONS

"Role of Application Gateways in A Global Intelligent Network" by Balaji C.V. Ramarao—pp. 358–367, May, 1992.
"Customers in Driver's Seat: Private Intelligent Network Control Point" by M. Sevcik, R. Lueder—pp. 41–44, Apr., 1995.
International Search Report—PCT/US98/09306, Jan. 15, 1999.

*Primary Examiner*—Andrew M. Dollnar
*Attorney, Agent, or Firm*—Fulbright & Jaworski L.L.P.

[57] ABSTRACT

A mobility extended telecommunications application and method of use which comprises an integrated wireless and wirelined network with central control and which has a programmed interface to translate between the different protocols of the wireless and the wirelined networks to allow for customized services to be furnished to said wireless network without the necessity of expensive switching and data handling devices. The application can be utilized between many networks and facilitates the utilization of the architecture of the wirelined network and the home location register of the wireless network for various applications on the wireless network.

82 Claims, 4 Drawing Sheets

MOBILITY EXTENDED TELEPHONE APPLICATION PROGRAMMING INTERFACE AND METHOD OF USE

The field of the invention relates to the use of a Local Area Network (LAN), or other private wired network as an element of a wide-area wireless intelligent network

ACRONYMS

The written description uses a large number of acronyms to refer to various services and system components.

Advanced Intelligent Network (AIN): The architecture of the wireline switched network (fixed wired telephones) that allows enhanced and customized services to be provided by the carriers Wireless Intelligent Network (WIN): The architecture of the wireless network switched (mobile telephones) that allows enhanced and customized services to be provided by the carriers. The network automatically tracks the location of the mobile telephone. It includes all networks commonly referred to as cellular or PCS.

Home Location Register (HLR): The application that acts as the central repository of the profile of each mobile and maintains the current location and status of the mobile unit.

Service Control Point (SCP): Defined in the Bellcore definition of intelligent networks, this network element is defined to be the device where services are controlled. In practice, the SCP will run applications that provide the services. The HLR is a service application that executes on the SCP. SCP applications are involved in the routing of a call.

Intelligent Peripheral (IP): A generic term for any of a number of devices that provide services but are not involved in the routing of the call. They may use information available from SCP based applications, and they may send messages to these or update profile files in the mobile's data record, however, switching elements are not expected to launch inquiries to IP's in order to determine the correct routing of the calls.

Mobile Switching Center (MSC): Defined in the Bellcore definition of intelligent networks as the network element that is responsible for the actual circuit switched connection of the voice channels. In the general sense, the MSC makes very few routing decisions, obtaining all those from the SCP applications. In practice, there are many basic routing decisions that are made by the MSC and the practice reduces the network load and processing load to the SCP.

Private Branch Exchange (PBX): A telephone switching system located on the end user's premises that allows local intercommunication with all local telephone sets and with the public network.

Local Area Network (LAN): A communication system that interconnects a number of computer processing units when those units are some distance away from one another, but within the same contiguous property to allow private communications facilities to be installed. For the purposes of this document, LAN shall also include the facility to allow multiple computer processors to communicate with each other when some or all of those processors are within the same enclosure and connected by a common backplane.

Signaling Transfer Point (STP): A Bellcore defined network element that is responsible for the correct routing of network signaling messages.

Visitor Location Register (VLR): An application that executes on the MSC which contains a temporary copy of the mobile telephones profile obtained from the HLR. It is stored locally to improve performance.

Personal Communications Service (PCS): This term is used widely in the industry to mean a number of things. For the purposes of this document, it will refer to the latest set of cellular frequencies made available in North America in the 1.9 GHZ range. Therefore a PCS network is one where the 1.9GHZ set of frequencies are being used. The document does not differentiate between PCS and cellular as a service and any difference between the two is not material to this invention.

Telephone Company (TELCO): The common carrier providing the wired service including the connection to the public switched telephone network (PSTN).

Mobile Identity Number (MIN): The telephone number of the mobile device. It is the primary identifier of the data profile contained in the HLR.

BACKGROUND TO THE INVENTION

The current cellular, PCS or any public wireless telephony network is now based on a design model defined by the Wireless Intelligent Network (WIN) architecture. This section defines why this model is used and what it details. We then show how the subject invention is used to enhance the application delivery mechanism of new features and services in the WIN.

The concept of intelligent telephony networks was first implemented by the wired (wireline) networks. Under the model of advanced Intelligent Network (AIN) wireline networks provide centralized control of telephone services provided to subscribers through diversely located central office switching systems. In an AIN type system, central offices send and receive data messages from a SCP via a STP.

In recent years, a number of new services have been provided by the AIN, and other AIN-like networks to provide personalized services to individual subscribers when at home or away from home. It is important to note that any services provided to individuals while they were away from home required the individual to manually register or notify the network of his present location. The network did not, nor does the AIN model provide for, any mobility management based in the network.

Modifications of the AIN system allow a TELCO to customize the routing of telephone calls via a graphical programming language used on a specialized terminal by TELCO personnel.

Prior art AIN systems are exclusively land line communications systems, i.e. they provide telephone communication services via wired telephone lines. The signaling protocol used for AIN allows only for control of telephone network switching elements in response to processes or software functions that are based on the calling number, called number and other relatively fixed items (time of day, congestion control and end user control, etc). Wired line communications, even those provided by the AIN, are necessarily limited by the fixed nature of installed lines. These systems make no provision for communications with any mobile link, except as taught by Emery et. al. in U.S. Pat. Nos. 5,469,496, 5,506,887.

While AIN is the intelligent processing related to the wireline networks, WIN is the intelligent processing of the wireless networks. In many ways they are similar and have used similar technologies, however, the model for WIN has a significant additional element, that of mobility. In the AIN architecture, both the originating and terminating telephone are assumed to be fixed, while in the WIN architecture, the location of the mobiles must be tracked by the networks. The HLR is the data register that tracks the location of the mobile and contains the subscriber profiles. It is because of this mobility element in the WIN architecture that makes WIN much different from AIN.

The cellular telecommunications industry has developed roaming standards which allow automatic handoffs from one cellular network to another during an established call, and to allow roaming from one system to another while having incoming calls follow the customer to the visited system. The protocol which accomplishes this are set out in the EIA/TIA standard IS-41. The IS-41 protocol is an out-of-band signaling protocol which may be transported by either X.25 or SS7 links.

The link between the mobile cellular user and the appropriate base station uses particular radio frequencies mandated by appropriate regulatory bodies. Dedicated trunk lines serve as the link between the base station and the MSC, and the interface between MSCs within the same system (same cellular carrier) is generally provided by dedicated land lines. Data links connect the mobile switching center to a VLR, and HLR, which can be located at the mobile switching center or at a remote point. Only the HLR may serve more than one MSC, the VLR is dedicated to the MSC that currently has control of the mobile. The subscriber record is erased when the mobile is no longer active or has moved to another MSC. The HLR is the location register which contains information about the user, such as directory number, profile information (feature list), current location, serial number, services authorized, and validation period. The VLR is the location register, other than the HLR in which an MSC temporarily stores and retrieves information regarding a visiting subscriber or user. The difference between the VLR and the HLR is simply that the HLR is the permanent storage place for the subscriber record while the VLR is a temporary storage place used during a configurable time. The use of the VLR reduces the amount of network signaling needed to process the call handling.

Many mobility controllers of the above described cellular systems are now programmed to provide subscribers selected special services. Until recently, such roaming subscribers engaged in the special feature calls required special support by the system and would not be handed off between systems without losing these special features. If the mobile subscriber had roamed to another system and registered on that system, the special features did not necessarily follow the subscriber. Data networks, such as SS7 networks, interconnect the mobility controllers with each other for data communications, for example to transfer necessary data from a subscriber's HLR to a VLR in the mobility controller the subscriber's mobile station is currently communicating with.

To enable seamless roaming for subscribers who use special services, the Wireless Intelligent Network (WIN) was developed. The WIN was developed as an extension to the CTIA's reference model. The first capability centers around consolidation of the network's location functions. Secondly, the network must have a robust SCP platform that runs multiple applications, and thirdly, the network must be enhanced by new "primitive" capabilities. A key enhancement to the WIN was realized by adding Service Control Function (SCF) functionality to the reference model. The SCF function replaced the HLR in the model and the HLR was redefined as an application using the SCF.

The WIN comprises three unique components. A MSC switch functionality which provides call processing (including inherent SSP capabilities), and features including call waiting, call forwarding, and three way calling. Secondly, the system also provides EIA/TIA IS-41 SS7 TCAP message protocol providing intersystem handoff, automatic call delivery, automatic roaming and, most importantly, remote feature access. Thirdly the WIN SCP provides mobility management, and a platform for hosting service logic (network applications).

Traditionally, the architecture of wireless networks places the burden of hosting new service applications on the mobile switch (MSC). MSCs are an extremely expensive network element, and are typically limited in the computing and database capacity needed to host new services and therefore are not well suited to support growth. By adopting the WIN architecture, wireless carriers place more network intelligence and mobility management functionality into SCPs. The WIN architecture is currently under deployment by various cellular carriers, and is suited for use in all cellular and PCS networks.

Currently, consumers generally have access to wireless networks that offer voice service. In a few cases, carriers who use the WIN architecture, and certain PCS carriers, minimal advanced services such as short messaging or voice mail are offered. The primary reason that consumers have such a limited suite of services from which to choose is due to the time and expense of developing services for use on a network wide basis. These services take many months to develop and must be justified by a business case that assumes use by the general population. The subject invention enables new applications to be developed and hosted in a focused, inexpensive and timely fashion to respond to customer demands.

As wireless network providers move from a duopoly to a competitive environment, they are being forced to move to a richer suite of advanced services to stave off the threat of new PCS/PCN service offers. An effective counter to the potential loss of profitability is to quickly develop and implement new service offerings. Also, recently licensed competitive carriers have a large stake in the ability to roll out new services in a timely manner. In the FCC "A", "B" and "C" block 1.9 Ghz spectrum auctions, spectrum winners paid 2 to 3 times the price per pop, or potential subscriber, when compared to the initial FCC cellular spectrum auctions. This portends that the new service providers will have to have operation cost levels that are lower than current cellular carriers in order to be similarly profitable.

Multiple vendors are beginning to develop products to support the WIN architecture. However, three issues must be addressed to meet the challenge of profitable, highly functional wireless networks. First, wireless applications must have a platform for operation that allows custom application tailoring to an individual customer's need, rather than the overall needs of all network users. Second, if this type of customization and scaling are to happen, the cost basis and development paradigm for these wireless applications must change dramatically. Third, billing and provisioning systems must be adapted to allow carriers to manage a new level of service flexibility and customization.

Prior patents related to the subject invention are discussed below:

Fuentes (U.S. Pat. No. 5,440,613) describes a method and apparatus for using an automatic PBX as a switching system for use in a cellular wireless telecommunications system. The invention uses a protocol converter, which communicates with a wireless cell site, that converts messages between ISDN protocol and a protocol for communicating with the wireless cell site. The Fuentes invention does not anticipate the subject invention, as the subject invention does not utilize the switching elements of a PBX to control the cellular communications network. Rather, the subject invention improves upon this art, as it utilizes existing WIN network elements, including MSCs, and uses a processor to establish a LAN as an element of a larger cellular WIN. The subject invention may utilize a PBX as an application that is networked with the larger WIN, but it does not rely upon the switching capability of the network to control mobility. Fuentes has replaced MSC with a PBX and uses ISDN as the protocol to establish control. The subject invention allows applications on the private network (LAN, WAN) to communicate with the network based SCF applications (eg HLR) to provide a programming interface.

Another set of inventions, Pinard et al. (U.S. Pat. No. 5,454,032) and Jones (U.S. Pat. No. 5,474,748) describe a form of connection between multiple telephony devices, including PBXs and wireless networks, but does so only to establish contact at a particular device, and not to enable any WIN mobility features. Pinard teaches a method of establishing a telephone communications link from a calling line to one of plural peripheral devices associated with a single telephone number in a central office telephone switching system or PBX. This invention provides a means for establishing a connection with a particular device where several communications devices are associated with a single number. This invention does not utilize or anticipate use of mobility features associated with a WIN, or the ability to create sub-elements of the WIN via connections with a LAN or WAN. Jones teaches a method of outdialing to a number of devices to test completion of a connection. This is performed via an algorithm that sequentially dials various devices to try to complete the connection. This approach as with the Pinard approach does not anticipate the use of mobility management capability by connecting a LAN and a wireless network. Furthermore Jone and Picard do not provide for the interconnection of applications.

Emery et al. (U.S. Pat. Nos. 5,469,496, 5,506,887) teaches integration of wireless and landline phones using the AIN wireline system to connect and control processing of calls to a PCS subscriber's wireless handset via a home base station or a wireless communication network. In the case of the Emery invention, specialized services are seamlessly provided by connections between a wireless (including cellular) network and a wireline AIN. This invention clearly does not anticipate the functionality of using a connection between a WIN and a customer premises based applications, such as a PABX. The Emery invention (U.S. Pat. No. 5,506,887) teaches that connections between a wireless network and a Centrex or PBX are made between MSCs and wireline switches, and not a SCP or a sub-SCP as contemplated in the subject invention. Also, the Emery invention does not facilitate mobility management on the private wireline network (LAN or WAN) via a logical HLR function contained within the LAN or WAN. Furthermore, the Emery invention does not anticipate the ability to customize and host new applications for the WIN on the customer premises LAN or WAN, but rather anticipates hosting applications on central wireline telephony AIN service controllers. The subject inventions provides for a interface between applications resident on the LAN, WAN or other network or processor and WIN based applications. Both Emery inventions do not contemplate linking applications located outside of the AIN.

Bales et al. (U.S. Pat. No. 5,502,757) teaches use of a number of terminal service profiles that are selected on the basis of the switching system to which a wireless mobile unit is registered. The Bales et al. invention allows distinct service activation based on the switching system that a mobile terminal unit is registered. This invention does not anticipate interconnection of wireless and wireline networks via a WIN architecture, nor does it anticipate using inherent mobility information contained with a WIN architecture to determine service provision. Those skilled in the art will recognize Bales' teaching as features provided in the public standard IS-41C. The DNA function is easily recognized as the HLR application. With this version of the protocol the HLR will have specific location information and will be able to cause the routing of terminating or originating calls to be modified based on the location of the mobile. An existing embodiment is the current practice of charging different rates for telephone service depending on the location. These features are obvious to those of ordinary skill in the art and suggest that the Bales patent is too broad and covers obvious extensions to standard protocols.

Mauger et. al. (U.S. Pat. No. 5,537,610) teaches a mobile communications network comprised of a PCS (PCN) network, PBX and local exchange. While the Mauger et. al. invention contemplates connection of a PBX, a local exchange and a public wireless network, it does not utilize an intelligent network architecture to manage mobility information. Furthermore, Mauger et. al. suggests that wireline and wireless network connectivity be established at the wireless network base station. This invention clearly does not anticipate the use of a WIN architecture to connect a wireline network (like a PBX) with a wireless network, nor the versatility and generality of the WIN interconnect solution. Mauger manages the routing of calls based on the dialed digits while the subject invention teaches that services and applications can be connected to WIN and does not directly implement new routing services. New routing service can be developed using the subject invention. The subject invention improves on Mauger et al by providing the interface to allow calls from private networks (PABX) to MS that have registered in the HLR as being local to the said PABX to be routed to the Intelligent Base Station (as defined by Mauger et al) even though the dialed digits may indicate that the dialed MS is not local to the PABX The following patents have also been reviewed. We have provided summary comparison to the subject invention.

Weis, U.S. Pat. No. 5,544,226 teaches Control wireless stations from a PBX. Does not interconnect applications and provide for new applications.

Ballard, U.S. Pat. No. 5,533,114 describes a method of switch cellular calls locally rather then transmitting them to a switching center that could be some distance away. Does not interconnect applications and provide for new applications.

Moore, U.S. Pat. No. 5,530,963 describes a method of routing datagrams to mobiles. This is an invention at the transport level not the application interface.

Owada, U.S. Pat. No. 5,542,094 describes a method of controlling mobiles using an ISDN interface to the local switch. This is an invention at the transport level, not at the application interface.

Tam, U.S. Pat. No. 5,526,403 describes a telephone set capable of receiving both cellular and land line telephone calls. This invention pertains to a new device.

Jain, U.S. Pat. No. 5,490,203 describes a method of locating a mobile user when the telephone handset is not the same unit as it is in cellular. This invention relies on monitoring calls and on now proactive action by the user.

The subject invention will enhance this feature by allowing simple applications to be written that will detect the presence of the nomadic user. The cellular PBX interconnect embodiment locates nomadic users be assuming that when their telephone is used they are there. It does not track calls in the same method as proposed by Jain.

Shrader, U.S. Pat. No. 5,521,963 describes a method for connecting and controlling mobiles through the use of a key system. This invention deals with mobile to basestation hand-off and is a transport level invention.

Carlsen, U.S. Pat. No. 5,509,062 describes a method of storing new number into a telephone when that telephone is idle. This is a transport level invention and deals with routing of calls.

Comer, U.S. Pat. No. 5,530,736 describes a method of having more than one telephone number (MIN) in a mobile phone. The subject invention makes no claims on such functionality of mobile phones.

Blust, U.S. Pat. No. 5,544,227 describes a method for connecting mobiles to a PBX. The subject invention makes no claims on such connection of mobiles sets to PBX systems.

Kage, U.S. Pat. No. 5,513,243 describes a method of locating mobiles by using the relative field strength of overlapping cells. The subject invention makes no claims on such techniques of locating mobiles.

Theimer, U.S. Pat. No. 5,493,692 describes a method of routing messages based on the content of those messages. The subject invention is broader in scope by providing a general interface between application and the network. In a specific embodiment of the subject invention, an EMAIL system could use the context of the message together with the status or profile information gathered from the network using the subject invention to make better message routing decisions. The subject invention allows for greater scope in the Theimer invention and improves upon it.

Grimes, U.S. Pat. No. 5,481,590 describes a method of signaling the telephone system as to which terminal device should be used to complete calls to the actual user. The subject invention only assumes one method of locating the user. The Grimes method could be used to facilitate such notification. Once the subject invention has such notification, it will signal the wireless network. The subject invention does not claim a method of notification.

Lannen, U.S. Pat. No. 5,497,412 describes a method of delivering calls to roaming mobiles using IS-41 A while still maintaining connection to non-IS-41 networks. The subject invention meaning assumes that a standard signaling protocol is available to the SCP and SCP based applications. While the information provided by the subject invention will assist in the delivery of calls, the subject invention makes no similar claims.

Sollner, U.S. Pat. No. 5,506,837 describes a method of interconnecting trunked mobile and cellular systems. The subject invention makes no such claims.

Morrisey, U.S. Pat. No. 5,418,844 describes a method of providing information services to callers based on the specific N11 type number dialed and the calling number profile. The subject invention does not depend on the dialed number, and it is an application interface at the local end of the connection.

Lantto, U.S. Pat. No. 5,428,665 describes a method to reduce the transaction impact on the HLR by having special services defined in a list at the MSC/VLR. Only if the requested service is not available at the MSCIVLR is a message sent to the HLR. The subject invention has no requirements or claims on the MSC or VLR. The subject invention in one embodiment, will allow the PBX to be acquired by the SCP as another MSC and will respond to messages in the same format.

Perkins, U.S. Pat. No. 5,159,592 describes to connection of data devices in a mobile environment. It is based on the management of unique network addresses. The subject invention makes no claims to manage network address in this manner.

Wegner, U.S. Pat. No. 5,377,186 describes a method of using the ISUP protocol instead of TCAP message to provide enhanced services to the local switch. The subject invention improves on this art by allowing any protocol to be connected to applications developed on LAN based processor to be connected to the SCP or switch. Wegener teaches a method of sending messages for the purposes of switching the call, whereas the subject invention provides the means to develop new and specialized services and does not directly involve switching the call.

Orris, U.S. Pat. No. 5,425,090 describes a method of providing enhanced 800 services based on the response from the 800 database. While an embodiment of the subject invention would be able to launch messages to the 800 database, the responses would be used to support enhanced applications and not to directly route the calls.

Yumoki, U.S. Pat. No. 5,379,383 describes a method of service control be storing specific service feature information. The subject invention allows application at the local (LAN) to be connected to network databases so that existing stored records can be accessed and not duplicated.

Bantz et al, U.S. Pat. No. 5,519,706 describes a method for registering new stations in a communications system.

Baker et al, U.S. Pat. No. 5,490,139 describes a system having a routing network architecture for efficiently handing off routing without changing operating systems.

Ahmadi et al, U.S. Pat. No. 5,533,026 describes a mobile network having the ability to update topology so location of mobile unit is known to all routers of the network.

The subject invention allows new applications to be developed that will utilize the primitives of information contained in the SCP applications to develop additional and highly custom applications.

Accordingly, it is an object of this invention to provide an improved combined network system consisting of both a private network and a wireless network wherein the private network appears as a node on said wireless network and allows open architecture applications on said private network to run on said wireless network.

It is a further object of this invention to provide a system whereby fixed telephones, associated with a mobile telephone, to be acquired by a mobile network management system as if they were mobile telephones themselves.

It is yet another object of this invention to provide a method of connecting private network based applications to network based applications in both AIN and WIN models.

Another object of this invention is to make a private wired or wireless, or combination network (WAN or LAN) logically appear to the cellular (WIN) network or wireline (AIN) as an extension of the network.

A further object of the invention is to reduce the cost of running specialized applications on wireless networks by utilizing portions of a private wireline network in lieu of multiple service control points.

SUMMARY OF THE INVENTION

The subject invention provides the programming interface between applications executing on a private data network and applications executing in the WIN.

The subject invention allows fixed telephones, associated with a mobile telephone, to be acquired by the mobile network management system as if they were mobile telephones by inferring mobility based on the actions of the fixed telephone. It also provides a method of connecting private network based applications to network based applications in both the AIN and WIN models. The subject invention makes a private wired, wireless, or combination, network (WAN or LAN) logically appear to the cellular (WIN) network or wireline (AIN) as an extension of the network with a "sub SCP" process that provides local mobility or profile information, and links to resident applications (private dialing plans, voice mail, PBX) that reside on other processes having access to the private network.

The "sub SCP" process consists of a process, between the network SCP and the private network-based application, which converts a TSAPI, or other standard link protocol, into the IS-41 protocol, or future WIN protocols, that is supported by the network-based HLR, or to existing remote server call or procedure call functions. The subject invention will allow other applications developed on the private network to extract or even modify the subscriber data stored in the SCP based application and to be enhanced with the added functionality of having knowledge of the subscriber profile stored in the based application. Both versions of the subject invention allow the interconnection of the AIN or WIN profile and WIN mobility information with applications developed and executing locally on a private network.

Reference is made to a TSAPI link which is the Novel's implementation of the Computer Telephony Interface as defined by the European Computer Manufacturer's Association Computer Supported Telecommunications Applications (ECMA CSTA). Other implementation include TAPI (from Microsoft) and proprietary links such as MiTAI from Mitel, Meridian Link from Nortel, and Call Path from IBM. TAPI, MAPI and TSAPI are Application Programming Interfaces (APIs).

Signaling from the private network interface to the network-based HLR will be over X.25, TCP/IP (internet) or appropriate private virtual circuits (closed user groups) and will use either the current IS-41 protocol (or future revisions or replacements) or proprietary remote service calls and procedures that may be available from specific vendors or the SCP/HLR. This connection will have the effect of acquiring the private network as an intelligent node on the cellular network, complete with its own unique addressing. Its support of the IS-41 protocol or vendor specific processes will ensure that minimal changes in the HLR software will be required and that the subject invention achieves the goal of lower implementation costs.

Furthermore the "sub-SCP" process can be extended with an SS7 link in order to allow the "sub-SCP" process to serve as a general SCP/HLR in the cellular carrier's network. This will allow carriers to lower operating costs by having a software-based HLR process that can run on lower cost server-class PC's or similar processors. In this instance, it is likely that the SCP process would be located on one of the cellular carrier s own private networks to ensure security and accessibility.

The subject invention achieves reduction in the cost of specialized and custom applications. Currently anew applications on the SCP can cost $100,000 to $1 million while new applications developed using the subject invention will cost $1,000 to $100,000 per license greatly reducing the cost of adding new services. As a common interface it will facilitate new inventions and applications that expand the functionality and use of the wireless and wired networks.

BRIEF DESCRIPTION OF THE DRAWINGS

These and other objects of the invention will become readily apparent when reference is had to the accompanying drawings in which.

DETAILED DESCRIPTION OF THE INVENTION

Figure 1:
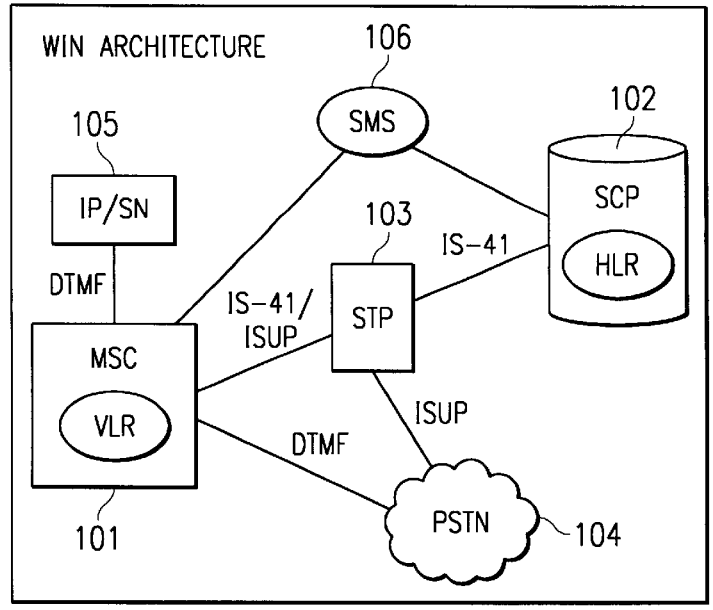
FIG. 1 represents Wireless Intelligent Network (WIN) architecture.

FIG. 1 represents the Wireless Intelligent Network (WIN) architecture. An MSC 101 is the Mobile Switching Center or telephone switching system. It switches the voice channels between cell site trunks and/or land line connection. The MSC connects to an STP 103. Architecturally, the STP is shown as a separate unit, however, it has been implemented directly on the same hardware platform as the MSC. The STP 103 transfers messages to other STP's for routing to other STP's, MSC, SCP or other network elements.

The SCP manages applications. An example of an application executing on the SCP (2), is the HLR, or Home Location Register. The HLR stores user profiles which include such items as (e.g. ESN[mobile serial number], MIN, current location, validation period and services that are authorized).

The STP is connected to the PSTN 104 via the signaling links. The MSC are connected to the PSTN 104, or public switched telephone network by the voice channels and in-band signaling.

Additional elements of this representative network are the intelligent peripheral/service node, IP/SN 105 and a Service Management System peripheral SMS 106. The IP is a generic term for various processors that supply specific functions (voice mail, short message service, etc.). IP's do not switch calls nor are they involved in the routing decisions needed to complete a call as is the SCP. The SMS is an architecturally defined processor that provides the ability to create new services by providing an easy interface to the applications on the SCP.

It is important to recognize that the WIN Architecture has an automatic and network based method of tracking the location of the mobile telephones. Mobility management does not require user intervention. Furthermore, the WIN has applications based in the network that are available to individual subscribers when authorized in the subscriber profiles stored in the HLR.

Figure 2:
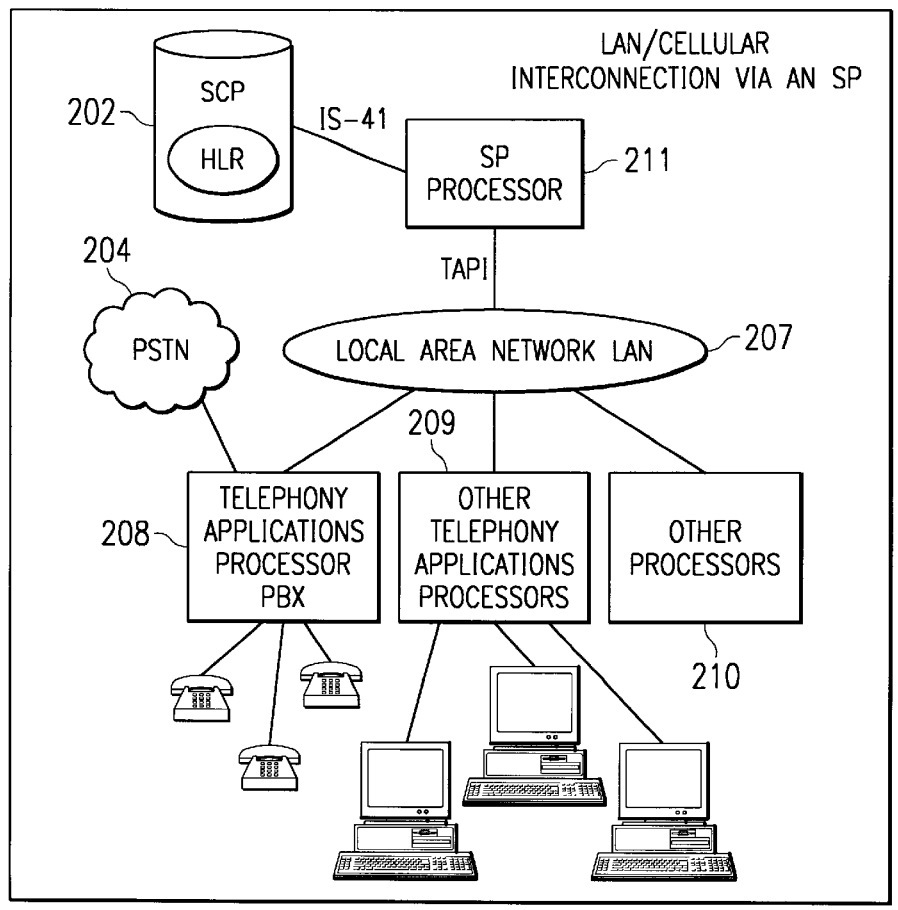
FIG. 2 represents a preferred embodiment of the invention showing a LAN/Cellular interconnection via an SP.

FIG. 2 depicts a preferred embodiment of the subject invention, transaction side version. It is useful to review this practical example to understand the details of the subject invention presented in the later drawings.

A Local Area Network, or LAN 207, is connected to: a PBX application processor 208, possibly other telephony application processors 209, and an SP Processor 211 that executes the software embodiment of the subject invention.

All processors communicate with the LAN over any one of a number of standard and well known methods used in commercial LAN configurations (e.g Token ring, or Ethernet). Also, any one of a number of protocols can be used to communicate over these transports (e.g. TCP/IP, NETBEUI), neither method is material to this invention. The application that need to access telephony information 208, 209 will implement one of a number of Telephone Application Programming interfaces. In this example we have shown the use to Microsoft Corporation's TAPI. The application opens TAPI defined channels to the SP and communicates with it in a manner defined by TAPI. The SP Processor 211, using the subject invention, translates TAPI into messages that are recognizable to the cellular network, in this example IS-41 commands, which are then transmitted to and from the SCP 202 via an X.25, TCP/IP or other private or public data link. As TAPI does not define messages knowledgeable about mobility, the subject invention also provides logical mapping of the requests between the two networks. For example, TAPI does not provide for the equivalent of REGISTRATION on the network. The subject invention then infers REGISTRATION when the TAPI message indicates that the telephone is in use. The subject invention then takes that fact and launches a REGISTRATION notification message to the HLR. A complete table of the mapping of IS-41 messages to functions is provided in Table 1.

The SP Processor translates messages from TAPI to IS-41 and back, and contains HLR-like information relating to applications within the LAN.

Figure 3:
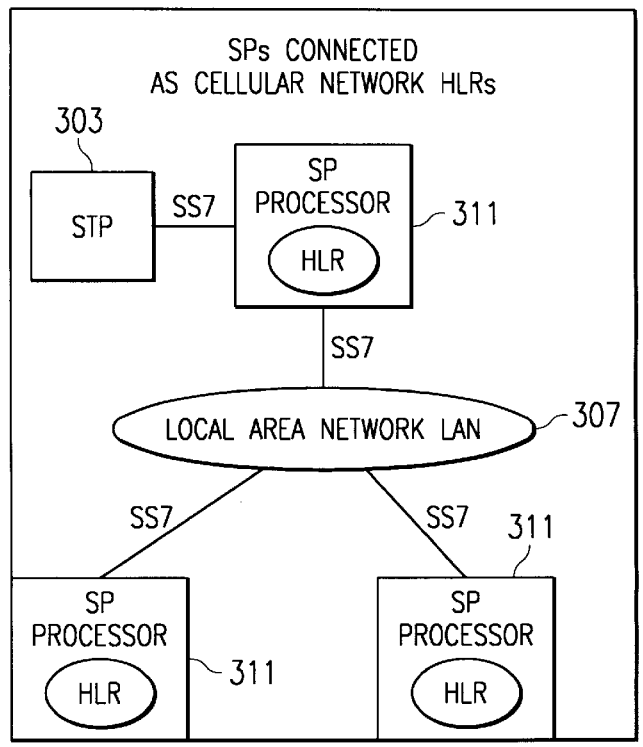
FIG. 3 shows SP processors connected to a LAN and connected to a cellular operator's service transfer point by an SS7 link.

FIG. 3 depicts use of the SP processors 311, connected to a LAN 307, and connected to the cellular operators' STP 303, via an SS7 link. In this embodiment of the invention, the SP processor implements the SCP based applications within the same processor or distributed processors on the LAN. The subject invention then translates the IS-41 messages as in FIG. 2 into applications that execute locally instead of on the SCP. In this embodiment, the local application replaces the SCP based ones by providing a standard interface to the mobile network to allow less expensive implementation of SCP type applications.

Figure 4:
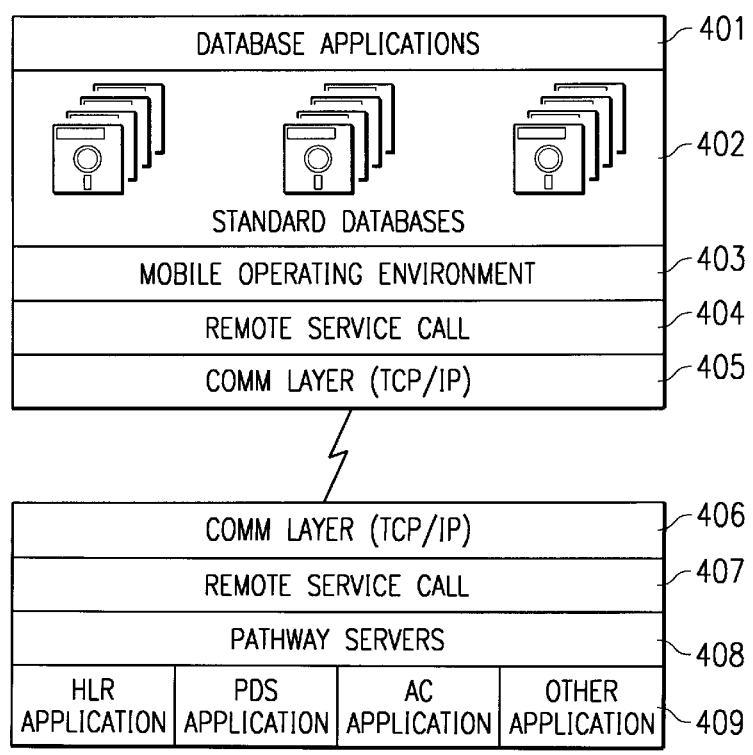
FIG. 4 shows the layering of the communications and applications that embody this type of connection.

FIG. 4 shows the layering of the communications and applications that embody this type of connection. Database applications 401 written in any number of languages access standard databases 402 for information, [e.g. SQL]. Those databases 402 are populated and updated from the network through the subject invention referred to here as the Mobile Operating Environment, (MOE) 403. MOE converts standard database requests into remote server calls 404 or other suitable and generally available transaction processors that coordinate with the SCP vendor specific database. In FIG. 3 the remote server call and pathway servers are commercially available products. The communications layer is similarly a commercially available product.

This embodiment converts standard database requests into the specific database transaction for the SCP application database 409 allowing highly available applications to extract and process subscriber profile information.

Figure 5:
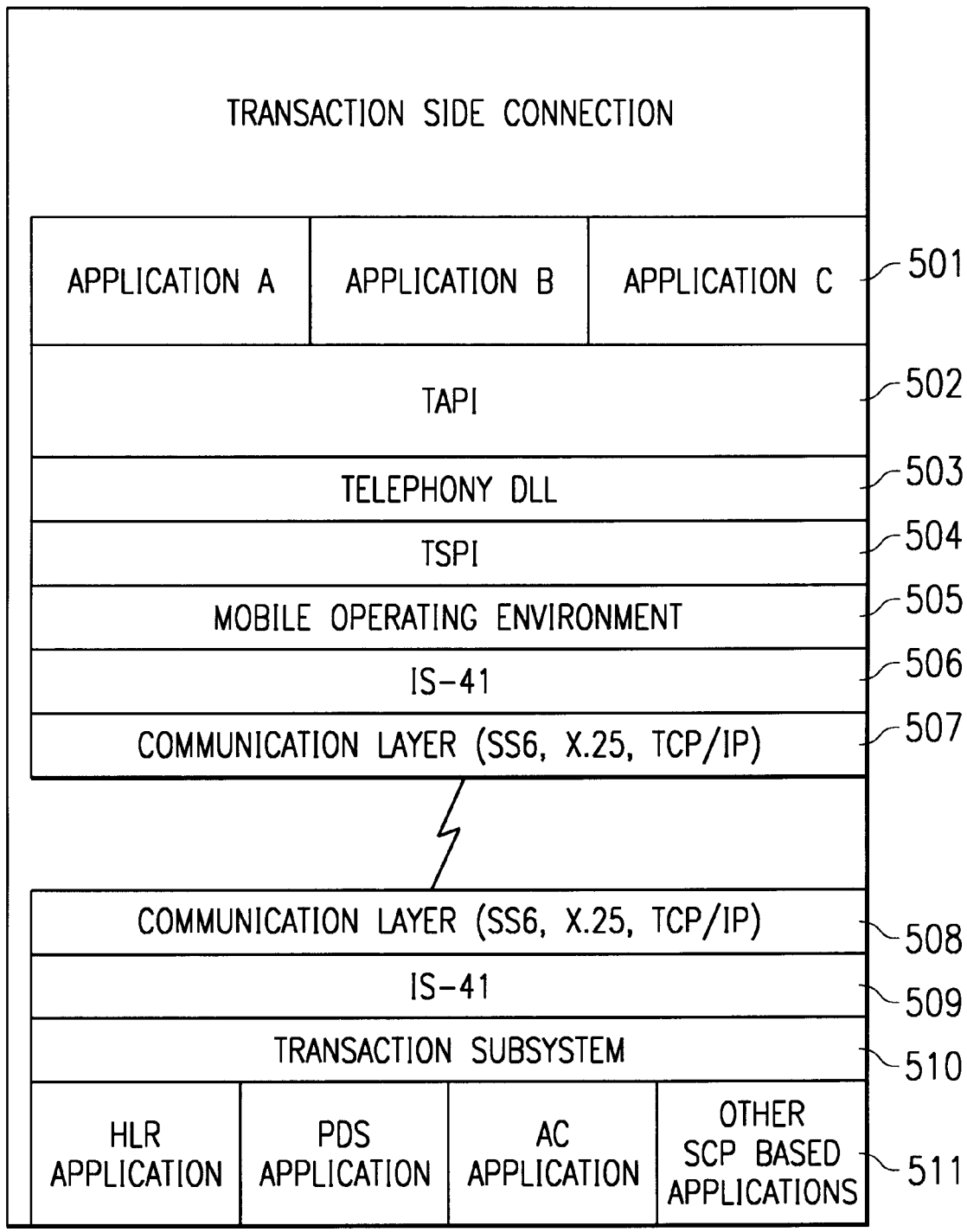
FIG. 5 shows the transaction side connection of the network interface.

As shown in FIG. 2 the PBX-cellular connection is an example of the Transaction side connection embodiment of the subject invention. FIG. 5 shows the logical connection of the various software components to complete the connection. Applications 501 executing on the LAN use an application programming interface (API) and in this example Microsoft's TAPI 502, which connect to the telephony dynamic link library 503 and then to the telephone service provider interface, TSPI 504. The subject invention, MOE 505 maps the calls from the TAPI/TSAPI into the IS-41 messages 506. The messages are then carried over a communications layer to the SCP. Items 508, 509, 510 and 511 are internal to the SCP. As this invention relies solely on converting the LAN based TAPI into IS-41, the subssystems internal to the SCP are not material and shown here for example only.

The preferred (EXEMPLARY) embodiment of the subject invention describes a connection between a cellular network, based on the WIN architecture, and a private network that hosts a PBX application. The functionality of the "sub SCP" (SP) is described, and, the implementation of cellular PBX interconnection is described as a sample application, extended by the SP interconnection. Other applications can be applied using the same architecture, including, but not limited to:

call redirection and auto follow me service. (calls to the cell or PBX number are automatically directed to the station where the person is most likely to answer)

fixed cell forwarding using PBX trunks (calls to the PBX number while the cellphone is fixed forwarded will result in the forwarding done at the PBX not the cell switch)

integration with pagers and meet me bridges. (calls to a PBX will invite the caller to leave a message or wait. System will page the subscriber to call in and join the call to the caller)

PBX voice mail message waiting indication on cell phone (voice mails left on the office PBX will cause an indication on the cellular telephone)

call screening based on CLID, time of day etc. (each PBX subscriber will be able to develop a screening list to route callers to local voice mail of cellular telephone depending on criteria)

screening list management from the cell phone the number and type of PBX messages will be displayed on the cell phone PBX set feature control via the cell phone Additionally, with the TSAPI extensions provided by the SP other CTI applications can be easily and quickly developed.

The SP element of the subject invention consists of a process, resident on a processor located on the connection between the cellular network SCP and an application running on the private network, that translates TSAPI or other CTI protocols to IS41 or future WIN protocols. This extension allows CTI applications software to be extended with mobility features. The system can also be set up to handle MAPI.

The SP process is connected to a cellular network-based SCP via an X.25 or similar private network connection. Signals and network messages from this connection are translated by the SP into TSAPI messages for use by applications processes resident on the private network to which the SP is connected.

Under the currently described implementation, the SP would support the following IS-41 messages to support an application such as cellular/PBX interconnection and refers to the Transaction side connection depicted in FIG. 5

TABLE I

| IS-41B Message Name (Total message set) | IS-41 defined Usage. (SP is logically located as a MSC) | SP required support |
|---|---|---|
| HandoffMeasurementRequest | From Serving MSC to adjacent MSC | SP will not launch this message. If received, SP is to return an error; OperationNot Supported. |
| FacilitiesDirective | From Serving MSC to Target MSC | SP will not launch the message. If received, SP is to return an error; OperationNot Supported |
| MobileOnChannel | From Target MSC to Anchor MSC | SP will not launch the message. If received, SP is to return an error; OperationNot Supported. |
| HandoffBack | From Serving MSC | SP will not launch the message. If received, SP is to return an error; OperationNot Supported. |
| FlashRequest | From Serving MSC | SP will not launch the message. If received, SP is to return an error; OperationNot Supported. |
| HandoffToThird | From serving MSC | SP will not launch the message. If received, SP is to return an error; OperationNot Supported |
| QualificationRequest | From MSC-V to HLR | SP will launch this message to determine if the SUB has a valid and authorized MIN on the cellular network. If received, SP is to return an error; OperationNot Supported |
| QualificationDirective | From HLR to MSC | SP will receive this message and record the contained profile settings. SP will not launch this message. |
| RegistrationNotification | From MSC to HLR | SP will send this message to indicate that the PBX extension is active and the SUB is now located at the PBX. If received, SP is to return an error; OperationNot Supported |
| RegistrationCancellation | From HLR to MSC | SP will receive this message to indicate that the SUB is now active at another location. SP will not launch this message. |
| LocationRequest | From MSC to HLR | SP will send this message when it has the SUB as inactive on the PBX and a call pending. If received, SP is to return an error; OperationNot Supported. |
| RoutingRequest | From HLR to MSC | SP will receive this message and return the proper routing number to reach the SUB. The SP will launch this message if it has a call pending and the SUB is not active on the PBX. |
| RemoteFeatureControlRequest | From MSC to HLR | SP will send this message to allow the SUB to change the mobile features from the office extension. If received, SP is to return an error; OperationNot Supported. |
| ServiceProfileRequest | From MSC to HLR | SP will send this message to confirm the SUB's mobile configuration. If received, SP is to return an error; OperationNot Supported. |
| ServiceProfileDirective | From HLR to MSC | SP will receive this message and update the current profile for the mobile. This message will not be sent by the SP. |
| TransferToNumberRequest | From MSC to HLR | SP will send this message to request transfer to number information. |
| CSSInactive | From MSC to HLR | SP will send this message to show that the SUB is no longer active on the PBX. If received, SP is to return an error; OperationNot Supported. |
| RedirectionRequest | From MSC to originating MSC | This message will not be implemented as it will require that the SP has an SS#7 address to allow messages from the originating MSC. There is currently no plans to allow the SP to have such an SS#7 address. |
| CallDataRequest | From MSC to HLR | This message will not be implemented. If received, SP is to return an error. |
| All set of O&M messages: Blocking; Unblocking; ResetCircuit; TrunkTest; TrunkTestDisconnect; UnreliableRoamerDataDirective | | This message is not supported by the SP. If received, SP is to return an error; OperationNot Supported |

The SP is also connected via a second X.25 or similar private network to a network management center, where billing and provisioning will be managed, and where network operations will be monitored. Network management messages would use existing commercially available Simple Network Management Protocol (SNMP) to manage the SP processors remotely.

Furthermore, the SP process can be extended with an SS7 link in order to allow the SP process to serve as a general SCP/HLR in the cellular carrier's network. This will allow carriers to lower operating costs by having a software-based HLR process that can run on lower cost server-class PC's or similar processors. In this instance, the SCP process would be located on one of the cellular carrier's own private networks to ensure security and accessibility.

Call control is initially built on the IS-41 standard as it contains the required call processing commands and will require a minimum of re-programming at the SCP side. As new features develop a different or enhanced protocol maybe required to provide the enhanced functionality that will result. The architecture of using the SP will continue for the foreseeable future as it will reduce the transaction capability and communication costs to the SCP while allowing extensive customization with the various PBX interfaces as well as other CPI applications that may exist at the customer's site.

Figure 6:
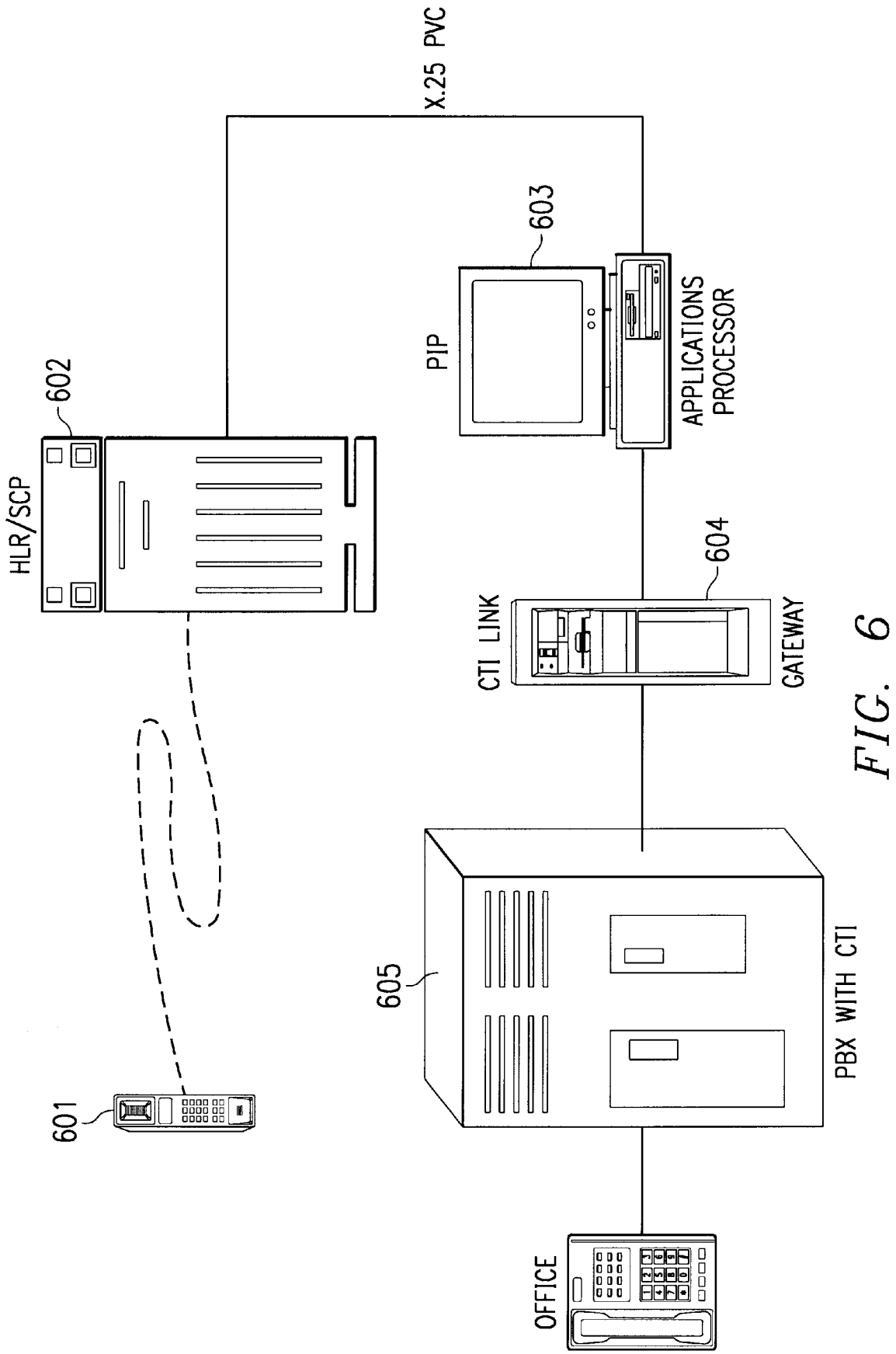
FIG. 6 shows a cellular PBX interconnection utilizing the invention.

A number of applications can be resident on the private network that can benefit from the SP interconnection to the cellular network. One such application is that of a PBX. The functioning of the PBX application, connected via the SP to the cellular network is further described as a preferred embodiment of the subject invention. FIG. 6 shows such an arrangement in detail with its PIP 603, HLR/SCP 602 and PBX with CTI 605. The CTI Link 604 and PIP 603 are designated as Cellpoint.

Cellular/PBX interconnection extends the PBX private network application with the inherent mobility management information that is contained in the cellular network. The SP converts a TSAPI link status, that is used by the PBX, into the IS-41 protocol that is supported by the HLR.

PBX users will have a number of configurable options that can customize the call treatment to suit the particular requirements. In general, however, features operate as follows:

The Subscriber (SUB) will select which number, the cellular number or the PBX number, is to be the primary contact number.

The last active location of the SUB will be tracked by the cellular based HLR. The HLR currently tracks active or registered mobile phones through the use of a protocol to the actual handset. Such a protocol does not exist with the PBX set, however, as the set is fixed, the system will infer activation if the set is used to receive or place calls.

The PBX detects set activity and passes this information to the PBX Interface Processor (SP) through the CTI link.

The SP converts the status information into IS-41 messages and launches the transactions to the HLR. The SP interprets the responses and launches routing directives to the PBX through the CTI link.

Calls routing to the cellular number first will complete to the mobile if active. If the subscriber is actually active on the PBX, the HLR will launch a RoutingRequest to the SP and confirm the routing digits. These digits will be treated exactly the same as a TLDN used to set-up a call in the cellular network.

Calls routing to the PBX first will complete to the PBX extension if active. If the extension is not active, the SP launches a Location request to the HLR to obtain the TLDN if active or an AccessDeniedReason if not active. Routing to the defined coverage path then completes the call.

The preferred embodiment allows the individual user the ability to specify either the mobile phone or office phone as primary. Callers can dial either the office number or the mobile number and be routed as outlined in Table 2. This embodiment requires that the user define the voice mail system and the prime phone to be the same. Future service offerings will allow the voice mail system to be chosen independently from the telephone prime.

TABLE 2

| Office phone Status | Mobile Status | Which number prime | Call completed to: | No answer routing |
|---|---|---|---|---|
| Idle and active | any | Office | Office | Office voice mail |
| Idle and inactive | idle and active | Office | Mobile | Office voice mail |
| Inactive | inactive | Office | Office voice mail | N/A |
| busy and active | any | Office | Office voice mail | N/A |
| any | idle and active | Mobile | Mobile | Mobile voice mail |
| any | busy | Mobile | Mobile voice mail | N/A |
| idle and active | inactive | Mobile | Office | Mobile voice mail |
| inactive | inactive | Mobile | Mobile voice mail | N/A |

Having described and shown the invention and the preferred embodiments thereof it will be obvious to those of ordinary skill in the art that many changes and modifications can be made without departing from the scope of the appended claims. It should be noted that the term "wireline (d)" is used to describe the basic network with or without phones and includes a private network. A resident application includes phones and PCS. The term "wireless" includes applications that are connected to a PCS and can be independent of a PCS.

We claim:

1. An integrated wireless and wired communications system having a wireline network with centralized control of telephone services provided to end users along with customized services and a wide area wireless network that provides customized services and applications, thereby providing mobility management to end users from any call point within the wireless network, said system comprising:

a wireless switched intelligent network having a protocol and standardized messages to facilitate interaction with the network based applications for enhanced and customized services, the wireless network further comprising service control points adapted to hold data bases or execute applications and at least one mobile switching center;

a wireline switched intelligent network having a protocol and standardized messages to facilitate interaction with the network based applications for enhanced and customized services; and means for connecting the wireline switched intelligent network to the wireless switched intelligent network enabling the wireless network to interact with the wireline network as if the wireline network was an integral part of the wireless network while providing local mobility and profile information to the integrated communications system, such means further comprising;

means for translating signals from the wireless network to the wireline network; and means for translating signals from the wireline network to the wireless network.

2. A system as in claim 1 and including links to at least one resident application.

3. A system as in claim 2 wherein the wireline network consists of a single processor with or without telephones connected.

4. A system as in claim 2 wherein said resident application includes a private dialing plan.

5. A system as in claim 2 wherein said resident application includes voice mail.

6. A system as in claim 2 wherein said resident application includes a PBX.

7. A system as in claim 1 and including a network interface means that provides said local mobility and profile information, said interface means providing a link between said wireless network means and said wireline network means to convert the wireless network protocol and signals into the wireline network protocol and API.

8. A system as in claim 7 wherein said wireless network protocol is IS-41 and the wireline network service is provided by an application that supports TAPI, TSAPI or any other telephony Application Programming Interface (API) and said network interface converts between the API and IS-41 signals and network based applications.

9. A system as in claim 8 wherein said wireless network means includes a home location register means associated with its service control point.

10. A system as in claim 9 wherein data transmission to and from said home location register means is over X.25.

11. A system as in claim 9 wherein data transmission to and from said home location register is over TCP/IP.

12. A system as in claim 9 wherein data transmission to and from said home location register is over a private virtual circuit.

13. A system as in claim 7 wherein data transmission to and from the networks utilize remote service calls and procedures.

14. A system as in claim 7 wherein said wireless network means includes a home location register means associated with its service control points, said network interface means in effect acquiring said wireline network means as an intelligent node on said wireless network complete with its own unique addressing function.

15. A system as in claim 14 wherein said wireless network means is a cellular network and includes a link means adapted to allow said interface means to serve as a general service control point and home location register means in said cellular network.

16. A system as in claim 15 wherein said interface means functions as a general service control point and home location register means on a private network portion of said cellular network.

17. A system as in claim 1 wherein the enhanced and customized services allow the storage and updating of the status of mobile telephones.

18. A system as in claim 1 wherein said wireless network means includes a home location register means associated with said service control points and adapted to serve at least one service control point.

19. A system as in claim 18 wherein said home location register means is adapted to serve multiple service control points.

20. A system as in claim 18 and including at least one intelligent peripheral means.

21. A system as in claim 20 wherein said intelligent peripheral means comprises voice mail.

22. A system as in claim 20 wherein said intelligent peripheral means comprises message paging.

23. A system as in claim 18 wherein said service control point is host to a dialing application.

24. A system as in claim 18 wherein said service control point is host to a virtual private network.

25. A system as in claim 1 wherein said wireless intelligent network means includes a server supporting open architecture applications.

26. A system as in claim 25 wherein said server supports a Windows NT application.

27. A system as in claim 25 wherein said server supports data transmitting standards.

28. A method of employing a wireline network as a node element of a wide area wireless intelligent network to afford connection between said networks which have different protocols, signals and API, the method comprising:
providing a data processor having means resident thereon to translate the protocol, signals and API of the wireless network to that of the protocol, signals and API of the wireline network, and to translate the protocol, signals and API of the wireline network to the protocol, signals and API of the wireless network;
connecting the processor to the wireline network;
connecting the processor to a service control point and home location register of the wireless network; and
operating the connected networks through the data processor to afford a platform for custom application tailoring of an individual user's needs on the wireless network and to provide mobility management to the wireless network by treating the wireline network as part of the wireless network, effectively forming the wireline network as an extension of the wireless network, facilitating call connection from one network to the other.

29. A method as in claim 28 and including the further step of acquiring fixed phones by said wireless network management as if they were mobile phones by inferring mobility based on actions of the fixed telephone.

30. A method as in claim 28 wherein private network based applications are connected to both wireline and wireless networks.

31. A method as in claim 30 wherein said wireless network is a cellular network and the wireline network appears as an extension of said cellular network with a sub service control point process causing said processor operation to provide mobility and profile information.

32. A method as in claim 31 wherein said sub service control point process also provides links to resident applications.

33. A method as in claim 32 wherein said resident application is electronic or multimedia mail.

34. A method as in claim 32 wherein said resident application is voice mail.

35. A method as in claim 32 wherein said resident application is a PBX.

36. A method as in claim 32 wherein said resident application is a private dialing plan.

37. A method as in claim 28 wherein the application programming interface used in said wireline network is TAPI, TSAPI, or any other telephony Application Programming Interface (API) means and the signal set of said wireless network is IS-41 or any other available signals supported with the wireless network.

38. A method as in claim 28 wherein other applications developed on said combined network extract and even modify subscriber or end user data stored in said service control point based application and may enhance said data with the added functionality of having knowledge of the subscriber or end user profile stored in the wireline based application.

39. A method as in claim 28 which allows for interconnection of the wireline network or wireless network profile and mobility information with applications developed locally on a private network.

40. A method as in claim 28 including the step of signaling from the wireline network interface to the home location register over X.25.

41. A method as in claim 28 including the step of signaling from the wireline network interface to the home location register over TCP/IP.

42. A method as in claim 28 wherein said operating step includes:
   storing user profile information on said home location register, and
   managing said user information on said service control point for applications on said wireline network.

43. A method as in claim 42 and including the additional step of running intelligent peripheral applications on said wireless network off of said service control point.

44. A method as in claim 43 wherein said peripheral application is voice-mail.

45. A method as in claim 43 wherein said peripheral application is message paging.

46. A method as in claim 42 and including the step of supporting open architecture applications on said wireline network by a server connected thereto.

47. A method as in claim 46 wherein said open architecture application is Windows NT, Windows 95, or Novell Network Operating System.

48. A method as in claim 42 wherein said wireline network supports applications using TAPI, TSAPI or any application with a telephone API means which use the data stored in the home location register of said wireless network.

49. A method as in claim 48 wherein said TAPI, TSAPI or any application with a telephone API means based application is voice mail.

50. A method as in claim 48 wherein said TAPI, TSAPI or any application with a telephone API means based application is electronic or multimedia-mail integration.

51. A method as in claim 42 wherein said user profile information includes information selected from the group consisting of current location, serial number, and services authorized.

52. An integrated network communications system, said system comprising:
   a switched cellular network based on wireless intelligent network architecture having a protocol and signals and at least one service control point with a home location register;
   a private wired network having at least one open architecture server hosting a PBX and having a protocol and signals or API; and
   a mapping device between the networks which translates the cellular protocol, signals or API to the private network protocol, signals or API and the private network protocol, signals or API to cellular protocol, signals or API, to effectively form the private network and server as an extension of the cellular network whereby the server co-acts with the service control point and home location register of the cellular network to support various applications.

53. A system as in claim 52 wherein said application is call redirection and auto follow me service where calls made to a PBX are automatically directed to the station where a person is most likely to answer.

54. A system as in claim 52 wherein said application is fixed call forwarding using PBX trunks where forwarding is done at the PBX.

55. A system as in claim 52 wherein said application is an integration with pagers and meet me bridges where the system pages subscriber or end users to join a call.

56. A system as in claim 52 wherein said application is PBX voice mail message waiting indication.

57. A system as in claim 52 wherein said application is screening list management from the cell phone.

58. A system as in claim 52 wherein said application is call screening and subscribers or end users are able to set criteria for the screening.

59. A system as in claim 52 wherein said application includes a PBX set feature control via a cellular phone.

60. A system as in claim 52 wherein the mapping device includes a processor which translates between the cellular and wired network protocols thereby allowing application software to be extended with mobility features.

61. A system as in claim 60 wherein the mapping device interaction with the service control point causes a sub SCP routine to execute allowing the private network to function as a node on the cellular network.

62. A system as in claim 61 wherein signals and network messages from said cellular network are translated by the processor from IS41 into TSAPI, TAPI or other API signals for use by applications resident on the private network.

63. A system as in claim 61 wherein the mapping device is connected to the networks by X.25.

64. A system as in claim 61 including a network management means, the mapping device being operatively connected to the network management means whereby network operations are monitored.

65. A system as in claim 61 including an SS7 link from the mapping device to service transfer points in the cellular network where the mapping device serves as a general service control point/home location register in the private network.

66. A method of connecting applications executing on a private data network with applications executing on a public wireless network, said networks having different protocols, signals and API and said public network having a data base containing profile and status information, said method comprising:
   translating the signals of the wireless network into signals for the private network;
   extracting the profile and status information stored on the wireless network;
   forwarding the translated signals, profile and status information to the private network;
   running customized user applications on the private network based on signals received from the wireless network; and
   translating signals from the private network applications into wireless network protocol to minimize the number of service control points required and to treat the private network as a node on the wireless network.

67. A method as in claim 66 wherein said wireless network is cellular.

68. A method as in claim 66 wherein said wireless network is Personal Communication Services (PCS).

69. A method as in claim 66 wherein said wireless network is Switched Mobile Radio (SMR).

70. A method as in claim 66 wherein said wireless network is Satellite.

71. A method as in claim 66 wherein said translation process occurs in the wireless network.

72. A method as in claim 66 wherein said translation process occurs in the private network.

73. A method as in claim 66 wherein said translation process occurs as a middle-ware sub process in an application running on a processor connected to the network.

74. A method for routing calls for a subscriber between a wireline network having a first protocol and a wireless network having a second protocol, comprising the steps of:

detecting if the subscriber is active on the wireless or wireline network;

when said calls are received by a network on which the subscriber is active:

routing said calls to the subscriber; and when said calls are received by a network on which the subscriber is not active:

translating signals associated with said calls from a receiving network protocol to an active network protocol; and routing said calls to the subscriber on said active network using said translated signals.

75. The method of claim 74 wherein the wireless network is a switched cellular network based on wireless intelligent network architecture having at least one service control point with a home location register.

76. The method of claim 75 wherein a last active location of the subscriber is tracked by the home location register.

77. The method of claim 74 wherein the wireline network is a private wireline network having at least one open architecture server hosting a PBX.

78. The method of claim 74 wherein said translating step is performed by a mapping device comprising:

a data processor having means resident thereon to translate the protocol of the wireless network to the protocol of the wireline network, and to translate the protocol of the wireline network to the protocol of the wireless network.

79. The method of claim 78 wherein a PBX detects activity of the subscriber on the wireline network and passes activity information to the mapping device.

80. The method of claim 79 wherein the detected activity comprises receiving or placing calls on the wireline network.

81. The method of claim 79 wherein the mapping device translates the activity information into signals for the wireless network and launches transactions with a home location register.

82. The method of claim 81 further comprising the steps of:

receiving, at said mapping device, signals from the home location register, translating said signals into routing directives for the wireline network, and sending said signals to the PBX for execution.

* * * * *